United States Patent [19]

Hayashi et al.

[11] Patent Number: 4,667,941

[45] Date of Patent: May 26, 1987

[54] SELF-LEVELING DAMPER FOR MOTORCYCLES

[75] Inventors: Yasuyuki Hayashi, Fukuroi; Naoyuki Sadaka, Iwata; Shigeru Murata; Shuichi Kawahara, both of Shizuoka, all of Japan

[73] Assignee: Kabushiki Kaisha Showa Seisakusho, Tokyo, Japan

[21] Appl. No.: 578,728

[22] Filed: Feb. 9, 1984

[30] Foreign Application Priority Data

| Feb. 9, 1983 | [JP] | Japan | 58-20469 |
| Feb. 9, 1983 | [JP] | Japan | 58-20470 |
| Feb. 9, 1983 | [JP] | Japan | 58-17967[U] |
| Feb. 9, 1983 | [JP] | Japan | 58-17968[U] |
| Feb. 9, 1983 | [JP] | Japan | 58-17969[U] |
| Mar. 14, 1983 | [JP] | Japan | 58-36555[U] |
| Mar. 15, 1983 | [JP] | Japan | 58-37280[U] |
| Apr. 27, 1983 | [JP] | Japan | 58-63753[U] |
| Jun. 16, 1983 | [JP] | Japan | 58-108453 |
| Jul. 4, 1983 | [JP] | Japan | 58-121242 |
| Jul. 22, 1983 | [JP] | Japan | 58-11479[U] |

[51] Int. Cl.$^4$ ............................................. F16F 5/00
[52] U.S. Cl. .................................. 267/64.16; 280/710
[58] Field of Search ................... 188/297; 267/64.15, 267/64.16, 64.17, 64.25, 64.26; 280/668, 672, 704, 710

[56] References Cited

U.S. PATENT DOCUMENTS 3,565,413 2/1971 Strauff ............................. 267/64.16
3,625,540 12/1971 Jewell .............................. 267/64.16

Primary Examiner—Duane A. Reger
Attorney, Agent, or Firm—Armstrong, Nikaido, Marmelstein & Kubovcik

[57] ABSTRACT

A self-leveling damper for motorcycles including a cylinder filled with hydraulic oil. A piston is slidably fitted in the cylinder. A hollowed piston rod is fitted at the lower end in the piston and projected at the upper end from the cylinder. The piston rod has a first oil path communicatable with the inside of the cylinder. A hollowed inner rod planted is fixed at the lower end on the bottom part of the cylinder and extends at the upper end in the first oil path of the piston rod. The inner rod has a second oil path communicatable with the inside of the cylinder. An upper bracket is secured to the upper end of the piston rod. A first spring seat is slidable relative to at least either the upper bracket or the cylinder. A second spring seat is secured to the other of them. A coil spring is stretched between the first and second spring seats. A hydraulic chamber is partially defined by the first spring seat. A third oil path connects the hydraulic chamber to the first and second oil paths; and a restricting mechanism restricting the return of hydraulic oil from the hydraulic chamber, the restricting mechanism being provided in the third oil path.

In the damper, the first spring seat and that one of the upper bracket and the cylinder to which the first spring seat is slidable are either made of iron at least about a sliding surface thereof and the other made of aluminum alloy.

6 Claims, 14 Drawing Figures

SELF-LEVELLING DAMPER FOR MOTORCYCLES

BACKGROUND OF THE INVENTION

1. Field of the Invention

The present invention relates to a self-leveling damper for motorcycles. More particularly, the invention relates to a self-leveling damper applicable to the rear wheel of a motorcycle.

2. Description of Relevant Art

There have been proposed a number of rear-wheel-oriented self-leveling dampers for motorcycles, such as in Japanese Patent Publication Nos. 42-11103 and 43-20487, in which a hydraulic damper provided with a cushion spring includes a hydraulically damping cylinder and a hydraulic chamber formed separately relative to the cylinder, whereby the hydraulic pressure generated in the compression stroke when a relatively large load is applied to the rear part of the motorcycle is conducted to be stored in the hydraulic chamber taking advantage of the expanding and contracting actions of the damper to raise the loading ratio of the damper relative to the cushion spring, thereby preventing the vehicle level from falling down, thus keeping the vehicle at a constant level.

However, such conventional self-leveling dampers are disadvantageous in the following points.

Namely, the sliding of a movable member as a part of the hydraulic chamber is not always smooth enough to assure a proper self-leveling effect.

Moreover, for the movable member, the returning period can not be adjusted in accordance with external variations such as of temperature and road conditions.

Further, under the state with hydraulic pressure built up in the hydraulic chamber, when the damper is caused to expand in an instant by a relatively large stroke, the hydraulic cylinder is liable to undergo a negative pressure, so that the vehicle level suddenly falls in an instant.

Furthermore, at the moment the vehicle is unloaded after stopping or parking, the vehicle level at once suddenly rises with the center of gravity of the vehicle, thus lacking stability.

The present invention has been achieved to effectively overcome come such disadvanges of conventional self-leveling dampers.

SUMMARY OF THE INVENTION

Accordingly, a first object of the present invention is to provide a self-leveling damper for motorcycles, in which the relative sliding motion between component members of a hydraulic chamber is firmly permitted to be kept smooth.

A second object of the present invention is to provide a self-leveling damper for motorcycles, in which the returning period of a movable member of a hydraulic chamber is favorably adjustable.

A third object of the present invention is to provide a self-leveling damper for motorcycles, that when a hydraulic cylinder has a negative pressure produced therein the the hydraulic pressure in a hydraulic chamber can be kept free from the effect.

A fourth object of the present invention is to provide a self-leveling damper for motorcycles, in which while parking the vehicle level the center of gravity can be left lowered.

According to the present invention, there is provided a self-leveling damper for motorcycles comprising a cylinder filled with hydraulic oil. A piston is slidably fitted in the cylinder. A hollowed piston rod is fitted at the lower end thereof in the piston and projected at the upper end thereof from the cylinder. The piston rod has a first oil path communicatable with the inside of the cylinder. A hollowed inner rod is fixed at the lower end thereof on the bottom part of the cylinder and is extended at the upper end thereof in the first oil path of the piston rod. The inner rod has therein a second oil path communicatable with the inside of the cylinder. An upper bracket is secured to the upper end of the piston rod. A first spring seat is slidable relative to at least either one of the upper bracket and the cylinder. A second spring seat is secured to the other of the upper bracket and the cylinder. A coil spring is stretched between the first spring seat and the second spring seat. A hydraulic chamber is partially defined by the first spring seat. A third oil path connects the hydraulic chamber to the first oil path and the second oil path. A restricting mechanism is provided for restricting the return of hydraulic oil from the hydraulic chamber, the restricting mechanism being provided in the third oil path, wherein the first spring seat and that one of the upper bracket and the cylinder to which the first spring seat is slidable are either made of iron at least about a sliding surface thereof and the other made of aluminum alloy.

The above and further features, objects and advantages of the present invention will more fully appear from the following detailed description of the preferred embodiments of the invention when the same is read in conjunction with the accompanying drawings.

DETAILED DESCRIPTION OF THE PREFERRED EMBODIMENTS

Figure 1:
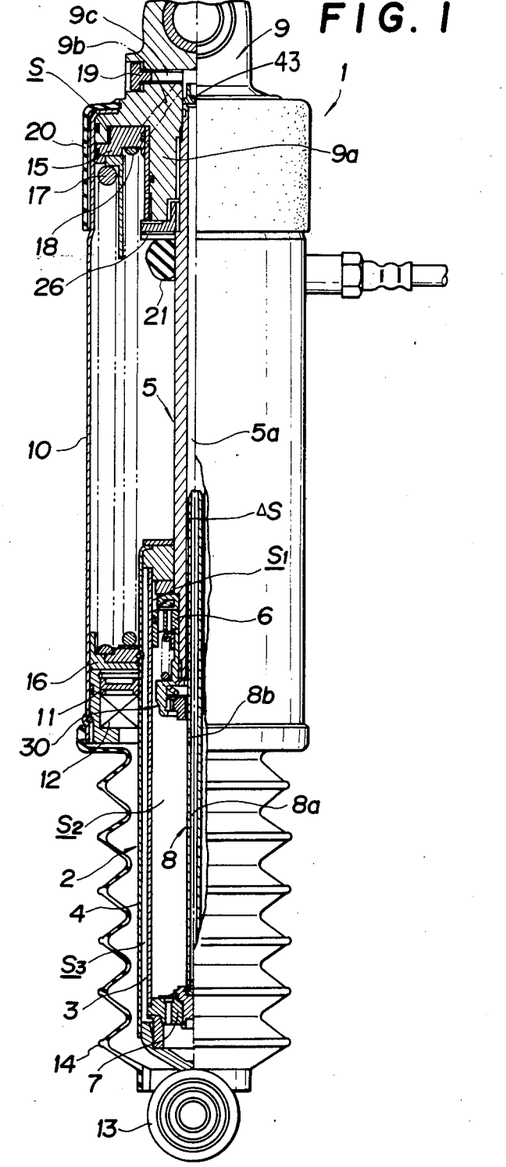
FIG. 1 is a side view, partly in section, of a self-leveling damper for motorcycles according to a first embodiment of the invention.

Referring first to FIG. 1, designated at reference numeral 1 is a hydraulic damper. The hydraulic damper 1 has a cylinder 2 of a double-tubular structure consisting of an inner tube 3 and an outer tube 4. The inner tube 3 is provided with a hollowed piston rod 5 inserted therein from above. The piston rod 5 has an axial hollow 5a formed therethrough and adapted to serve as an oil path while the damper 1 is working. A piston 6 is secured to the lower end of piston rod 5 and is vertically slidably fitted in the inner circumference of the inner tube 3.

At the bottom part of the cylinder 2, there is provided a bottom piece 7 secured thereto. The bottom piece 7 has at the central part thereof a hollowed inner rod 8 fixed thereon and loose-fitted in the hollow 5a of the piston rod 5 with a clearance ΔS provided therebetween. The inner rod 8 has therein an axial hollow 8a opening at the upper end thereof and an oil hole 8b drilled in the axially intermediate part thereof.

The cylinder 2 includes upper and lower hydraulic chambers S1, S2 enclosed by the inner tube 3 and separated from each other by the piston 6 and an oil reserving chamber S3 formed between the inner and outer tubes 3, 4. The chambers S1, S2, and S3 are filled with hydraulic oil.

The piston rod 5, projecting upwardly from the cylinder 2, is secured at the upper end thereof to an upper fixing bracket 9, namely, screwed into a downwardly projecting central cylindrical portion 9a of the upper bracket 9. The bracket 9 is joined along the outer circumference thereof with the upper end of a tubular outer case 10. The outer case 10 has, in th lower part thereof, fitted therein a guide member 11 and a seal member 12, which are both in slidable contact with the outer circumference of the outer tube 4. The outer tube 4 is enclosed in an elastic dust boot or expansion bellows 14 fixed at the upper end thereof to the lower end of the outer case 10 and at the lower end thereof to a lower fixing bracket 13 secured to the lower end of the cylinder 2.

Figure 2:
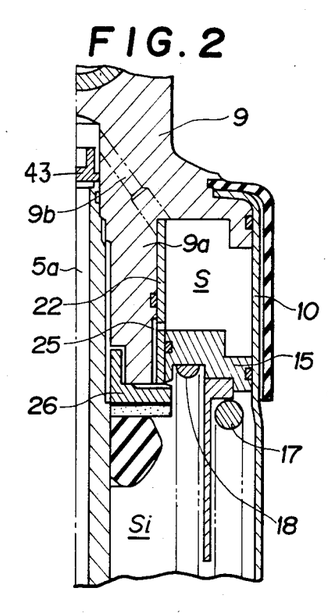
FIG. 2 is an enlarged partial sectional view of an arrangement about a hydraulic chamber of the damper of FIG. 1.

Referring now to FIG. 2, between the inner circumference of the upper part of the outer case 10 and the outer circumference of the cylindrical portion 9a of the upper bracket 9, there is vertically slidably fitted an annular plunger 15. The plunger 15 is for leveling of the motorcycle and concurrently serves as an upper spring seat for holding respective upper ends of outer and inner coil springs 17, 18 which are each respectively supported at the lower end thereof by a lower spring seat 16 fitted between the inner circumference of the lower part of the outer case 10 and the outer circumference of the outer tube 4. Between the upper bracket 9 and the outer case 10, there is provided a hydraulic chamber S defined at the bottom thereof by the plunger 15. The chamber S communicates with the hollow 5a of the piston rod 5 through a plurality of oil paths 9b formed through the bracket 9. Also contained within the bracket 9 is a check valve 43 which will later be described with reference to FIG. 6 check valve 53.

As shown in FIG. 2, in the first embodiment of the invention, there is employed an arrangement in which the cylindrical portion 9a of the upper bracket 9, which is made of an aluminum alloy, has an iron sleeve 22 fixedly fitted thereon, i.e., fixedly interposed between the cylindrical portion 9a and the plunger 15, which is also made of an aluminum alloy, to render smooth sliding travel of the latter along the former.

Figure 3:
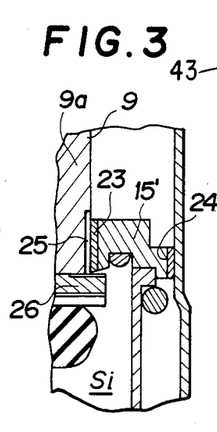
FIG. 3 is a view similar to FIG. 2, showing a modified arrangement according to the first embodiment.

In this respect, in FIG. 3 showing a modified arrangement, an annular plunger 15' has at the inside thereof an inner iron sleeve 23 fitted therein to be slidable therewith along the outer circumference of a cylindrical portion 9a of an upper fixing bracket 9 and at the outside thereof an outer iron sleeve 24 fitted thereon to be slidable therewith along the inner circumference of an outer case 10, thereby achieving a similar smoothing effect.

Figure 4:
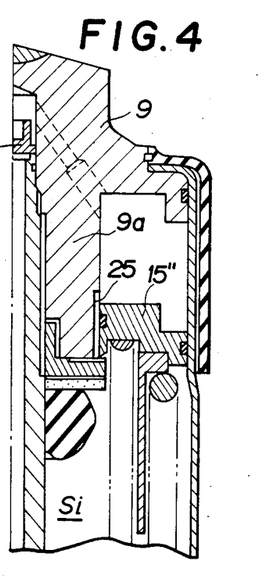
FIG. 4 is a view similar to FIG. 2, showing another modified arrangement according to the first embodiment.

Moreover, in the case of FIG. 4 showing another modified arrangement, an annular plunger 15" itself is made of iron to thereby achieve a smoothing effect similar to that of FIG. 3.

In each of the arrangements shown in FIGS. 2 to 4, the cylindrical portion 9a of the upper fixing bracket has in the sliding surface thereof with the plunger 15, 15', or 15" a proper number of oil slots 25 formed near the lower travel end of the plunger 15, 15', or 15", permitting hydraulic oil in the chamber S to be released when the volume thereof is caused to exceed a predetermined value, thereby preventing the hydraulic pressure in the chamber S from rising excessively. The hydraulic oil released by leaking from the chamber S is returned from the inner space of the outer case 10 to the outer tube 4 of the cylinder 2.

The lower travel end of the plunger 15 is established with a flanged tubular stopper 26 screwed on the piston rod 5. The stoper 26 abuts from below on the bottom face of the cylindrical portion 9a of the upper fixing bracket 9. Further, on the piston rod 5, at the cylinder 2 side of the stopper 26, there is fitted a rubber stopper 21.

As shown in FIG. 1, the upper bracket 9 has formed therein an air releasing path 9c communicating with the oil paths 9b and opening to the atmospheric air, while being stopped at the opening end thereof with a plug 19. Moreover, the outer case 10 is covered from outside at the upper end part thereof, i.e., over the range the plunger 15 is permitted to slide, with a protector 20 made of an elastic body such as rubber.

Figure 5:
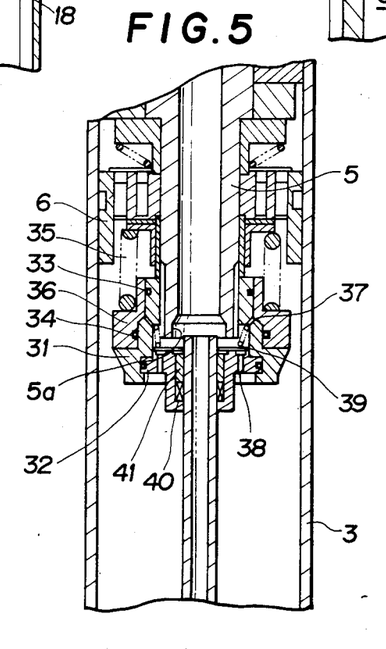
FIG. 5 is an enlarged partial sectional view of an arrangement about a valve housing under a piston of the damper of FIG. 1.

Referring now to FIG. 5, the piston rod 5 has near the lower end of the hollow 5a a valve housing 31 secured thereto and provided with a spring seat 36 slidably fitted thereon for carrying the lower end of a spring 35. Spring 35 upwardly biases the piston 6. The sliding of the seat 36 is favorably assisted with a pair of O-rings 33, 34. The valve housing 31 has a plurality of oil paths 37 formed therethrough to permit communication between the inside of the valve housing 31 near the lower end of piston rod 5 and outside of the valve housing 31 on which the spring seat 36 is slidably fitted. In the lower part of the valve housing 31, there is fitted a valve seat 32 facing from under the lower end of the hollow 5a of the piston rod 5. The valve seat 32 is formed therethrough with a plurality of axial oil paths 38 arranged on a single pitch circle and provided thereon with a check valve 39. The check valve 39 closes and open the upper ends of the oil paths 38. The valve seat 32, which is integrally assembled with the piston rod 5, is axially slidably fitted on the outer circumference of the inner rod 8, with a seal member 40 and a Teflon bush 41 tight-fitted therebetween.

There will be described hereinbelow the function of the hydraulic damper 1.

In the compression stroke of the damper 1, as the piston rod 5 moves with the piston 6 downwardly relative to the cylinder 2, the hydraulic pressure in the lower hydraulic chamber S2 rises, thus urging a part of the hydraulic oil therein to rise up on one hand the hydraulic oil rises up from the oil paths 38 of the valve seat 32, pushing open the check valve 39 to rise upwardly via the clearance S between the inner rod 8 and the piston rod 5. On the other hand, the hydraulic oil also rises up from the oil hole 8b and via the hollow 8a of the inner rod 8, then through the hollow 5a of the piston rod 5, finally into the hydraulic chamber S. The hydraulic oil conducted into the chamber S exerts pressure on the upper face of the plunger 15, causing the plunger 15 to slide downwardly, thereby compressing the outer and inner coil springs 17, 18 interposed between the plunger 15 and the lower spring seat 16, while increasing the spring load thereof. As a reaction to the increased spring load, the damper 1 becomes expanded as a whole, thus resulting in a corresponding rise of the vehicle level.

As understood from the foregoing description, in this embodiment, the relative sliding between the cylindrical portion 9a of the upper fixing bracket 9 and the plunger 15, 15', or 15" is smoothly effected in the form of a surface contact between aluminum alloy and iron. In addition the telescopic interconnection between the valve housing 31 and the inner rod 8 is favorably effected by the combination of the seal member 40 and the Teflon bush 41 arranged adjacent to each other and tight-fitted therebetween to prevent oil leakage from therebetween and to smooth the telescopic sliding thereof, thereby permitting a smooth leveling of motorcycle. Moreover, in the self-leveling damper, the air releasing path 9c permits residual air in the hydraulic chamber S to be vented to the atmosphere, thereby securing a reliable action of the plunger 15. Further, the outer case 10 is effectively protected, about a plunger-sliding portion thereof in which the plunger 15 is slidably fitted, by the rubber protect 20 fitted thereon against external shocks such as by sprung pebbles, thus assuring a safe and reliable leveling of motorcycle.

Figure 6:
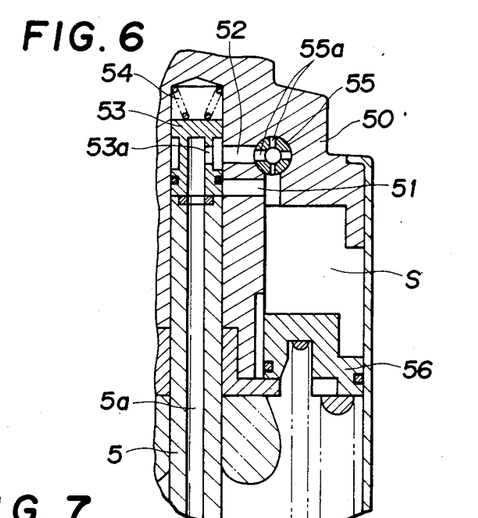
FIG. 6 is a view showing an adjusting mechanism for adjusting the outflow from a hydraulic chamber.

FIG. 6 shows an arrangement according to a partial modification of the above-described embodiment relating to the intercommunication between a hollow 5a of a piston rod 5 and a hydraulic chamber S.

In FIG. 6, designated at reference numeral 50 is an upper fixing bracket. The bracket 50 has drilled therethrough an inflow path 51 to the hydraulic chamber S and an outflow path 52 therefrom, which paths 51, 52 are both connected through a check valve 53 or restricting means to the hollow 5a of the piston rod 5. The check valve 53 is vertically slidably fitted in the bracket 50 and normally biased downwardly with a spring 54 to close the inflow path 51, while concurrently permitting through a small hole 53a formed therein the outflow path 52 to communicate with the hollow 5a.

As the hydraulic pressure in the hollow 5a rises exceeding a predetermined level, the check valve 53 will be caused to move upwardly against the resilient force of the spring 54, thus opening the inflow path 51 to let hydraulic oil into the hydraulic chamber S. In the course of the outflow path 52, there is disposed a select valve 55 of a hollowed cylindrical configuration with the axis thereof directed transversely of the outflow path 52. The select valve 55 has in the cylindrical wall thereof a plurality of radial oil holes 55a opened therethrough with different diameters, and is arranged so as to be rotatable about the axis thereof manually from outside or by remote control. This arrangement permits a voluntary selection of any oil hole 55a to have the hydraulic chamber S communicate with the hollow 5a of the piston rod 5 through a desirous hole diameter established by the selection. As a result, when the damper load is removed or reduced, the return oil flow from the chamber S to an inner tube as a part of a cylinder as well as the returning time of a plunger 56 is voluntarily adjustable according to such factors as to the atmospheric temperature and road conditions.

Figure 7:
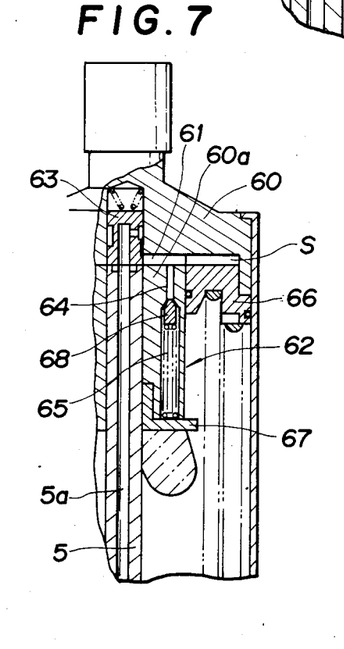
FIG. 7 is a view showing an overpressure preventing mechanism of a hydraulic chamber.
Figure 8:
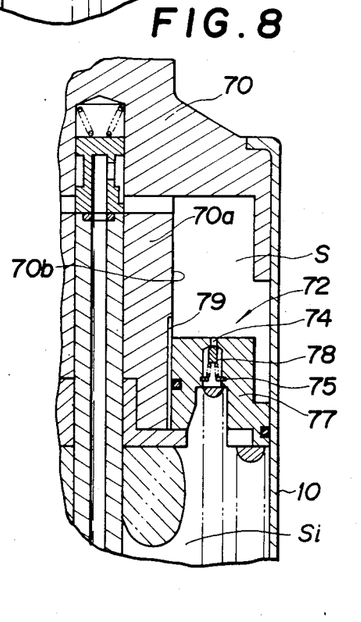
FIG. 8 is a view showing a modified arrangement of FIG. 7.

FIGS. 7 and 8 show two types of arrangement according to another partial modification of the first embodiment relating to a blow-off mechanism to prevent the inner pressure of a hydraulic chamber S from rising excessively.

In FIG. 7, designated at reference numeral 62 is a blow-off mechanism arranged in a downwardly projected cylindrical portion 60a of an upper fixing bracket 60, along a part thereof constituting the inner wall of the hydraulic chamber S. The blow-off mechanism 62 comprises an oil bypassing path 64 opening at one end thereof to an oil path 61, which connects a hollow 5a of a piston rod 5 through a check valve 63 to the hydraulic chamber S, and at the other end thereof toward the upper face of a flanged stopper 67 fixed to the piston rod 5. The stopper 67 is properly positioned to establish the lower travel end of a plunger 66, and a check valve 68 is vertically slidably installed in the bypassing path 64 and is normally biased upwardly with a spring 65 to close the path 64. The check valve 68 is to open the bypassing path 64 to vent oil of the oil path 61, when the inner pressure of the hydraulic chamber S has reached a predetermined level.

In FIG. 8, a blow-off mechanism 72 is arranged in a plunger 77. The plunger 77 has an oil path 74 vertically formed therethrough. The oil path 74 opens at the upper end thereof to the hydraulic chamber S and at the lower end thereof to an inner space defined under the plunger 75. Similarly to FIG. 7, the oil path 74 has therein a check valve 78 normally upwardly biased with a spring 75. In a sliding surface 70b of a cylindrical portion 70 of an upper fixing bracket 70 against the plunger 70, there is formed a plurality of oil releasing slots 79 sized so as to cause the hydraulic chamber S to communicate with the space beneath the plunger 77 when the plunger 77 has come down close to the lower travel end thereof with an increase in the inner pressure of the chamber S. In this respect, the blow-off mechanism 72 effectively serves to prevent, by causing the check valve 78 to slide down to open the oil path 74, the hydraulic pressure in the chamber S from rising abnormally when all or some of the oil slots 79 happen to be stopped up such as by dust or metallic substances.

With reference to FIGS. 9 to 12, there will be described hereinbelow the constitution and function of a self-leveling damper according to a second embodiment of the invention in which a hydraulic chamber communicating with a hollow of an inner rod is provided on the outer circumference of a cylinder. The description will not include the basic constitution which is like that of the first embodiment.

Figure 9:
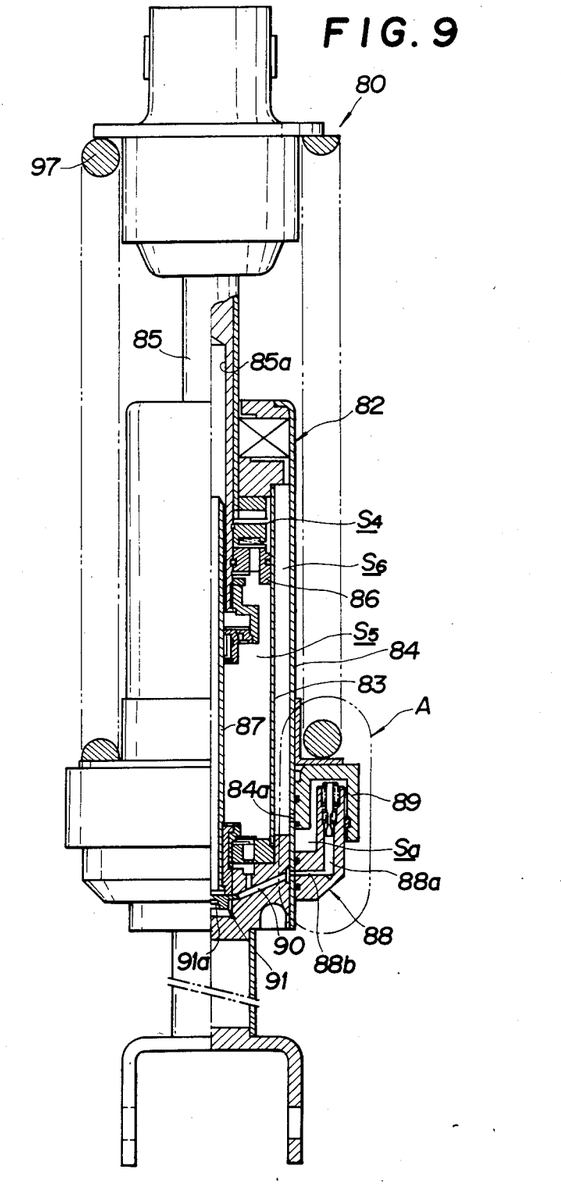
FIG. 9 is a side view, partly in section, of a self-leveling damper for motorcycles according to a second embodiment of the invention.

Referring now to FIG. 9, designated at reference numeral 80 is a self-leveling damper applicable to the rear wheel of a motorcycle. The damper 80 includes a cylinder 82 consisting of an inner tube 83 and an outer tube 84. The outer tube 84 has in the lower part of the side wall thereof a spring adjuster 89 slidably fitted thereon. The adjuster 89 functionally corresponds to the plunger 15 of the first embodiment while serving as a lower seating mount of a coil spring 97, and an adjuster guide 88 fixedly fitted thereon and telescopically fitted from under in the spring adjuster 89. Between the adjuster guide 88 and the spring adjuster 89, there is defined a hydraulic chamber Sa communicating with the inside of a hollowed inner rod 87 through a plurality of communication paths each respectively consisting of an axial hole 88a and a radial path 88b both formed in the adjuster guide 88 and an oil path 90 and through a check valve 91 provided at the lower end of the inner rod 87. The check valve 91 has an orifice 91a drilled in the central part thereof. In the side wall of the outer tube 82, there are opened a plurality of oil holes 84a which permit the hydraulic chamber Sa to communicate, when the spring adjuster 89 is pushed up higher than a predetermined level, with an oil reserving chamber S6 formed between the inner and outer tubes 83, 84. The oil holes 84a are normally closed by the spring adjuster 89.

Figure 10:
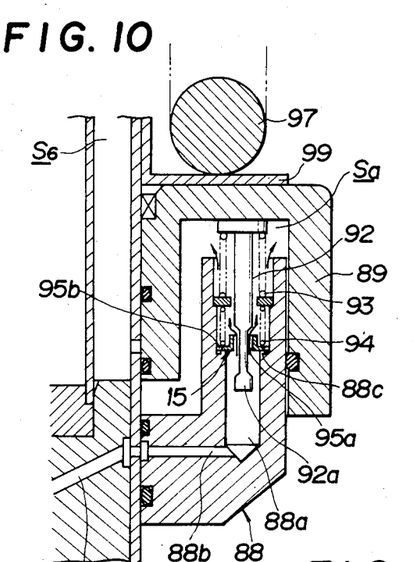
FIG. 10 is an enlarged sectional view of a part in circle "A" of FIG. 9.
Figure 11:
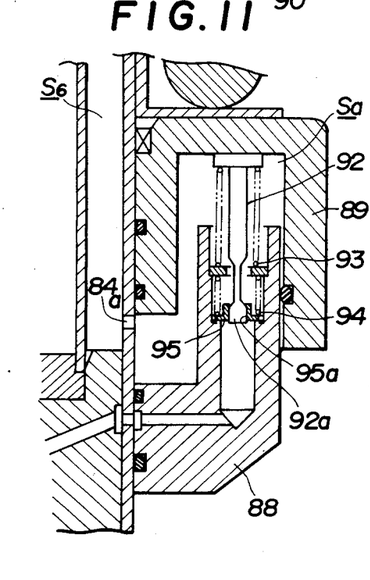
FIGS. 11 and 12 are sectional views similar to FIG. 10, for explaining the function of a vehicle level sensor and a check valve mechanism.

As clearly shown in FIG. 10, in each of the axial holes 88a formed in the adjuster guide 88, there is provided a sensor rod 92 for detecting the vehicle level from the vertical position of the adjuster 89. The sensor rod 92 is normally biased upwardly with a spring 93 and abuts at the upper end thereof from under on the upper wall of the adjuster 89. Moreover, the axial hole 88a has at the axially intermediate part thereof a ringlike valve seat 88c formed on the inner wall thereof, on which is seated a movable ringlike plate 95 normally biased downwardly with a spring 94 as shown in FIG. 11. The movable plate 95 has a central hole 95a opened therethrough and loose-fitted on the throat part of a valve 92a formed at the lower end of the sensor rod 92. Further, the movable plate 95 is formed at the outer circumferenc thereof with a plurality of slits 95b. Designated at reference numeral 99 is a spring seat.

There will be described below the function of the damper 80.

When the piston rod 85 is caused to move downwardly relative to the cylinder 82 with an increase of damper load, the inner rod 87 is caused to move upwardly relative to the piston rod 85, so that hydraulic oil flows from inside of the inner rod 87 through the check valve 91, the oil path 90, and the radial path 88b into the axial hole 88a of the adjuster guide 88 and then through the central hole 95a of the movable plate 95 into the hydraulic chamber Sa, where it exerts hydraulic pressure, thereby pushing up upon the spring adjuster 89. As a result, the resilient force of the coil spring 97 increases, thus upwardly urging to restore the vehicle level to be kept constant.

As understood from the foregoing description, when the spring adjuster 89 moves upwardly, the sensor rod 92, which is normally biased upwardly with the spring 93, will also move upwardly therewith, finally causing the valve 92a to be tight-fitted in and thus stopping the central hole 95a of the movable plate 95, as shown in FIG. 11. In this manner, the lower end of the sensor rod 92 cooperates with the movable plate 95 to function as a check valve.

Under this state, in which the hydraulic chamber Sa has been shut off from communication with the inside of the inner rod 87, when the damper stroke is instantaneously expanded thus forcing the piston rod 85 to move upwardly relative to the cylinder 82 and reducing the hydraulic pressure in the inner rod 87, the hydraulic chamber Sa filled with hydraulic oil will keep the spring adjuster 89 from reacting to the instantaneous large increase of the damper stroke, thus holding the position of FIG. 11.

According to this embodiment of the invention, therefore, it is favorably permitted to keep the vehicle level from varying each time when an instantaneous large change takes place in the damper stroke, thus successfully improving the steering stability.

Figure 12:
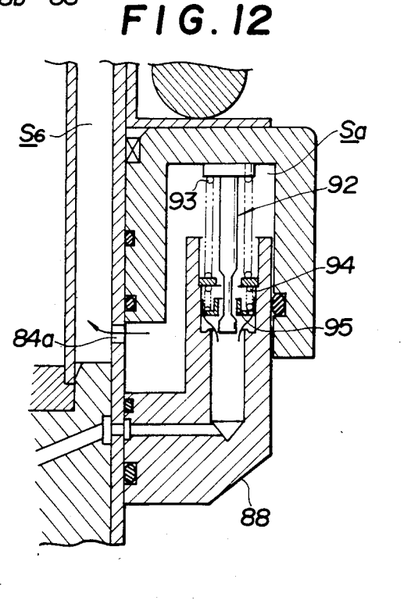

Following the state of FIG. 11, when the hydraulic oil is additionally fed, the hydraulic pressure will push up the movable plate 95 against the resiliency of spring 94, thus admitting the oil into the hydraulic chamber Sa through the oil slits 95b formed in the outer circumference of the movable plate 95, as shown in FIG. 12. However, in the state where the oil holes 84a are opened with the spring adjuster 89 pushed up as illustrated in FIGS. 11, 12, excessive hydraulic oil in the hydraulic chamber Sa will be released through the oil holes 84a to the reserving chamber S6, so that the spring adjuster 89 will not gain additional rise.

In the second embodiment, there is employed a mechanical system including a sensor rod for preventing a spring adjuster from reacting to an instantaneous large change of the damper stroke. In this respect, there may be employed an electric or electronic system of such type.

Figures 13, 14:
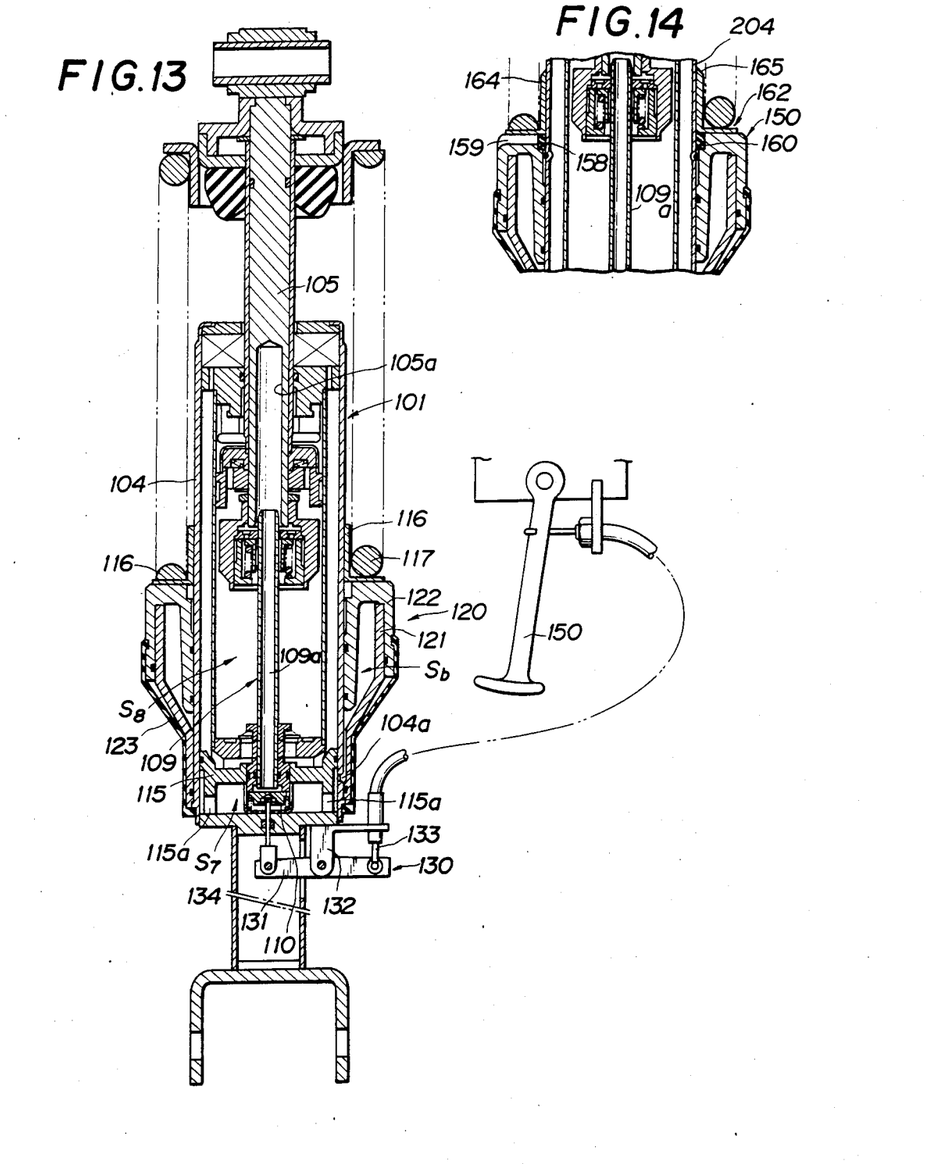
FIG. 13 is a sectional side view of a self-leveling damper for motorcycles according to a third embodiment of the invention.
FIG. 14 is an enlarged view of an arrangement about a lower spring seat, showing a dust removing mechanism for removing dust on the outer circumference of a cylinder.

Referring now to FIG. 13, there will be described hereinbelow the constitution and function of a self-leveling damper, as applied to a motorcycle having a side stand, according to a third embodiment of the invention in which the side stand is mechanically interlocked with a check valve installed in an oil path for the intercommunication between a hydraulic chamber and a cylinder of the damper. The description will not include the basic constitution which is like that of the before-described embodiments.

In FIG. 13, designated at reference numeral 101 is a cylinder of a self-leveling damper. The cylinder 101 has in the lower part thereof a hydraulic chamber S7 formed therein. The chamber S7 is intermittently communicatable through a check valve 110 provided thereto with a hollow 109a of a hollowed inner rod 109. On the lower outer circumference of the cylinder 101, there is provided a spring adjuster assembly 120 of a hydraulic type comprising a substantially conical guide member 121 fixedly fitted at the reduced lower end thereof on the cylinder 101. The guide member 121 opens upwardly. An adjust member 122 is vertically slidably fitted on both the cylinder 101 and the guide member 121. A hydraulic chamber Sb is enclosed by the guide member 121 and the adjust member 122. The hydraulic chamber Sb communicates with the hydraulic chamber S7 through a plurality of small holes 104a drilled in the side wall of an outer tube 104 of the cylinder 101. A plurality of oil holes 115a opened through the side wall of a bottom piece 115 is fitted in the lower end part of the outer tube 104. The adjuster assembly 120 is provided with an adjuster cover 123 fitted on the side wall thereof and a spring seat 116 abuts from above on the adjust member 122.

The cylinder 101 is provided at the lower end thereof with an opening mechanism 130 which includes a bracket 132 projecting downwardly from the lower end of the cylinder 101 and a lever 131 vertically rockably pivoted at the central part thereof on the bracket 132 and connected at one end thereof through a wire cable 133 to a side stand 140 of the motorcycle the damper is applied to and at the other end thereof through a rod 134 to the check valve 110.

In such a case as when riding double or loading luggage, the inner rod 109 will enter into a hollow 105a of a hollowed piston rod 105, thus sending the hydraulic oil through the hollow 109a of itself, the check valve 110, the hydraulic chamber S7, the oil holes 115a, and the small holes 104a to the hydraulic chamber Sb of the adjuster assembly 120, while causing the adjust member to move upwardly and hence compressing the spring 117 to raise the spring load thereof.

After removing the load from the motorcycle, thus after once putting the damper in a free state, when the side stand 140 is turned into the standing position thereof, the wire cable 133 will cause the lever 131 to rock counterclockwise in the Figure, thus pulling down the rod 134, thereby forcibly opening the check valve 110, so that the hydraulic oil in the hydraulic chamber Sb of the adjuster assembly 120 returns instantaneously through the check valve 110 to the hydraulic chamber S8 of the cylinder 101. As a result, also the load setting of the spring 117 returns in such an instance to an original or minimum-setting state, thus lowering the vehicle level.

As understood from the foregoing description, according to a third embodiment of the invention, for a damper employed in a motorcycle with a side stand, it is permitted to instantaneously lower the level of the motorcycle when the side stand 140 is put in the standing position, to thereby stabilize the position of a body of the motorcycle, thus effectively avoiding situations such as the motorcycle falling down.

FIG. 14 shows an arrangement according to a partial modification favorably applicable to the second and third embodiments of the invention. Designated at reference numeral 162 is a lower spring seat fitted on an outer tube 204 of the damper cylinder. The spring seat 162 is designed in a flanged tubular configuration and has a tubular central portion 164 male-tapered at the upper end part 165 thereof, to thereby effectively clean dust on the outer tube 204 when the spring seat 162 moves upwardly relative to the outer tube 204. There is again provided an adjust member 150, which has on the inner circumference of the upper end thereof a ringlike fitting groove 158 formed therein and on the upper face thereof a plurality of (e.g. three) dust releasing slots 159 formed therein radially from the fitting groove 158. A dust seal 160 is fitted in the fitting groove 158 and tight-fitted on the outer tube 204. Accordingly, even those fine dust particles which the tapered end 165 of the spring seat 162 cannot remove from the outer tube 204 are to be removed by the dust seal 160, when the adjust member 150 moves upwardly, and the dust is guided to be discharged through the dust releasing slots 159.

In the above-described arrangement, the outer tube 204 and the spring adjust member 150 may be made of a cast iron and an aluminum alloy, respectively, to render relatively smooth sliding therebetween.

We claim:

1. A self-leveling damper for motorcycles, comprising:
    a cylinder filled with hydraulic oil;
    a piston slidably fitted in said cylinder;
    a hollow piston rod fitted at a lower end thereof in said piston and projected at an upper end thereof from said cylinder; said piston rod having therein a first oil path communicatable with the inside of said cylinder;
    a hollowed inner rod fixed at a lower end thereof on a bottom part of said cylinder and extended at an upper end thereof in said first oil path of said piston rod; said inner rod having therein a second oil path communicatable with the inside of said cylinder;
    an upper bracket secured to the upper end of said piston rod;
    a first spring seat slidable relative to at least either one of said upper bracket and said cylinder;
    a second spring seat secured to the other one of said upper bracket and said cylinder;
    a coil spring stretched between said first spring seal and said second spring seat;
    a hydraulic chamber partially defined by said first spring seat;
    a third oil path connecting said hydraulic chamber to said first oil path and said second oil path;
    restricting means for restricting the return of hydraulic oil from said hydraulic chamber, said restricting means being provided in said third oil path; and
    said first spring seat and said either one of said upper bracket and said cylinder to which said first spring seat is slidable are either made of iron at least about a sliding surface thereof and the other made of aluminum alloy.

2. A self-leveling damper according to claim 1, wherein:
    said either one to which said first spring seat is slidable is said upper bracket;
    said hydraulic chamber is substantially defined by said first spring seat and said upper bracket; and
    said upper bracket has formed therein said third oil path and an air releasing path communicating with said third oil path and opening to the atmosphere.

3. A self-leveling damper according to claim 1, wherein:
    said third oil path comprises an inflow path to and an outflow path from said hydraulic chamber;
    said restricting means comprises a first check valve to open said inflow path in accordance with respective hydraulic pressures in said first oil path and said second oil path;
    said first check valve is provided with a small hole to have said first oil path and said second oil path communicate with each other when said inflow path is closed by said first check valve; and
    said outflow path has therein a select valve with a plurality of oil holes of different diameter, said select valve having said oil holes selectively communicate with said hydraulic chamber and said small hole of said first check valve.

4. A self-leveling damper according to claim 1, wherein:
    said either one to which said first spring seat is slidable is said upper bracket;
    said hydraulic chamber is substantially defined by said first spring seat and said upper bracket; and
    said first spring seat and said upper bracket are either provided with an oil releasing path communicating with said hydraulic chamber, said oil releasing path being provided with a second check valve to open in accordance with the hydraulic pressure in said hydraulic chamber.

5. A self-leveling damper according to claim 1, wherein:
    said damper is installed in a vehicle; and said damper further comprises a sensor for detecting the level of said vehicle from the movement of said first spring seat, and a shutting mechanism for shutting said third oil path to substantially close said hydraulic chamber when said sensor has detected a level of said vehicle higher than a predetermined value.

6. A self-leveling damper according to claim 1, wherein:

said damper is installed in a motorcycle having a side stand;

said restricting means comprises a third check valve to open said third oil path in accordance with respective hydraulic pressures in said first oil path and said second oil path; and said third check valve is operatively connected to said side stand of said motorcycle.

* * * * *

UNITED STATES PATENT AND TRADEMARK OFFICE
CERTIFICATE OF CORRECTION

PATENT NO. : 4,667,941

DATED : May 26, 1987

INVENTOR(S) : Yasuyuki HAYASHI et al

It is certified that error appears in the above-identified patent and that said Letters Patent is hereby corrected as shown below:

On the cover page, Item [30], the last priority application number, change "58-11479[U]" to -- 58-114791[U] --.

Signed and Sealed this

First Day of September, 1987

Attest:

DONALD J. QUIGG

Attesting Officer      Commissioner of Patents and Trademarks